(12) United States Patent
Bowe

(10) Patent No.: US 6,306,465 B1
(45) Date of Patent: Oct. 23, 2001

(54) METHOD OF COATING AN UNCURED MINERAL SUBSTRATE

(75) Inventor: Michael Damian Bowe, Newtown, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/614,745

(22) Filed: Jul. 12, 2000

Related U.S. Application Data

(60) Provisional application No. 60/147,016, filed on Aug. 3, 1999.

(51) Int. Cl.$^7$ ............... B05D 1/36; B05D 1/38; B05D 3/02
(52) U.S. Cl. .................. 427/393.6; 427/407.1
(58) Field of Search ............... 427/393.6, 407.1

(56) References Cited

U.S. PATENT DOCUMENTS

| | | |
|---|---|---|
| 3,832,223 | 8/1974 | Wohl . |
| 4,177,232 | 12/1979 | Day ............ 264/133 |
| 4,789,319 | 12/1988 | Garcia ............ 425/131.1 |
| 4,986,744 | 1/1991 | Weisweiler et al. ............ 425/94 |
| 5,017,320 | 5/1991 | Garcia ............ 264/148 |
| 5,215,827 | 6/1993 | Dotzauer et al. ............ 428/500 |

FOREIGN PATENT DOCUMENTS

| | | |
|---|---|---|
| 4341260 A | 5/1994 | (DE) . |
| 0 430 146 A2 | 6/1991 | (EP) . |
| 0 432 924 A1 | 6/1991 | (EP) . |
| 2344300 | * 6/2000 | (GB) . |
| 1609783 | * 11/1990 | (SU) . |
| WO 98/52698 | 11/1998 | (WO) . |

* cited by examiner

*Primary Examiner*—Erma Cameron

(57) ABSTRACT

A high gloss coating on a mineral substrate, such as a roof tile or floor tile, can be achieved by a method comprising:
i) forming said substrate from an uncured mineral composition, preferably a green concrete, clay or fiber cement;
ii) forming a continuous layer of film-forming polymeric binder over a surface of said substrate formed in i) by:
    a) applying to said surface a first coating composition comprising film-forming polymeric binder, and
    b) destabilizing said first coating composition prior to application of, upon contact of, or subsequent to application of said first coating composition on said surface;
iii) applying to the coated surface formed in ii) a second coating composition comprising a film forming polymeric binder; and
iv) drying and curing said coated substrate formed in iii), for example in an oven or autoclave.

10 Claims, No Drawings

METHOD OF COATING AN UNCURED MINERAL SUBSTRATE

This application claims benefit of Prov. No. 60/147,016 filed Aug. 3, 1999.

This invention is concerned with a method of coating an uncured mineral substrate. More particularly, though not exclusively, this invention concerns a method of coating an uncured cementitious substrate, such as a concrete roof, floor or wall tile or a concrete house siding, to give the substrate a high gloss finish.

Precast concrete roof tiles are typically produced from a concrete mortar whose consistency is such that it can be molded whilst in its green state into a design having features of shape, configuration, pattern or ornament which it will retain when cured. The tiles are usually formed of a layer or layers of green concrete molded to correspond to the desired surface appearance of the tiles. The tiles may be formed of a single layer of concrete or they may be formed of multiple layers of concrete, for example as disclosed in U.S. Pat. Nos. 4,789,319, 4,986,744 and 5,017,320.

Where a smooth finish on the upper surface of the tile is desired, the tile usually comprises at least two layers, the upper most layer being formed from a green concrete or cementitious slurry, comprising hydraulic cement, fine-grained aggregates, pigments and dispersing agents. This upper most layer has a thickness typically from 0.05 mm to no more than 3 mm and may be applied to the coarser base layer(s), for example, by a process such as described in any of the above U.S. patents or by curtain coating the formed tile.

Concrete roof tiles tend to be susceptible to efflorescence when exposed to atmospheric moisture or precipitation. To suppress efflorescence in concrete roof tiles, it has been common practice to coat the upper side of the cured or uncured concrete roof tiles with an aqueous paint or clear coat composition which, when dry, provides a waterproof coating. Such aqueous paint compositions will typically comprise from 30 to 50% by weight of polymer dispersion, for example an aqueous, acrylate-based polymer dispersion, from 20 to 60% by weight fine inorganic filler, for example chalk, barytes and/or silica, and optionally from 2 to 10% by weight iron oxide pigment. Such aqueous clear coat compositions typically consist essentially of a 100% acrylic dispersion (e.g. 30–50% solids). Coatings formed from such paint and clear coat compositions tend to have a thickness on the tile of no greater than 0.15 mm. Improved efflorescence suppression has been proposed through the use of relatively more complex copolymer dispersions, such as those described in DE-A-4341260 and U.S. Pat. No. 5,215,827, as replacements in whole or in part for the more conventional simple acrylate-based polymer dispersions.

In U.S. Pat. No. 4,177,232 there is disclosed a method of making a concrete roof tile which has improved efflorescence resistance. In this method, a formed tile body is coated with a cementitious slurry and before that slurry layer has cured, an aqueous emulsion of a film forming polymeric material is applied thereto. The fully cured tiles formed by this method exhibit low gloss finishes.

It is often desirable for a concrete roof tile to exhibit a high gloss finish. A high gloss finish is typically obtained by a process of applying a coating of an aqueous clear coat composition to the uppermost surface of the tile after the tile has been dried and cured in an oven or autoclave, and then drying the coating. Alternatively, a high gloss finish may be obtained by a process of applying a coating of a non-aqueous clear coat composition to the uppermost surface of the tile either before or after the tile has been dried and cured.

In WO-98/52698 a fast-setting coating material is prepared by contacting a stable aqueous dispersion of a polymer that contains strong cationic groups and weak acid groups onto a substrate that is basic, such as cementitious materials, or rendered to be basic. As an alternative to using a basic substrate, it is disclosed that the quick setting coating material can be prepared by contacting in either order or concurrently, the surface of a substrate with two separate polymers, one of which contains strong cationic groups, and the other of which contains weak acid groups. Though it is disclose in WO-98/52698 that the aqueous dispersions may be used, amongst other applications, to coat cured or uncured cement to reduce water evaporation, thereby to improve the properties of the final concrete, there is no disclosure or suggestion for using the aqueous dispersions to provide a high gloss finish on a concrete substrates.

It is an object of the present invention to provide a finished mineral substrate, such as a roof tile, which exhibits a high gloss finish but which has been manufactured by a method which either is quicker and potentially more energy efficient than previously known methods employing aqueous coatings or which does not rely upon the use of solvents used in non-aqueous coatings for making the same.

In accordance with the present invention, there is provided a method of coating a mineral substrate with at least one coating composition comprising a film forming polymeric binder, which method comprises the following process steps:

i) forming said substrate from an uncured mineral composition, preferably a green concrete, clay or fiber cement;

ii) forming a continuous layer of film-forming polymeric binder over a surface of said substrate formed in i) by:
   a) applying to said surface a first coating composition comprising film-forming polymeric binder, and
   b) destabilizing said first coating composition prior to application of, upon contact of, or subsequent to application of said first coating composition on said surface;

iii) applying to the coated surface formed in ii) a second coating composition comprising a film forming polymeric binder; and iv) drying and curing said coated substrate formed in iii), for example in an oven or autoclave.

In accordance with a second aspect of the present invention, there is provided a method of improving the gloss finish of a mineral substrate formed by a process comprising the following process steps:

i) forming said substrate from an uncured mineral composition, preferably a green concrete, clay or fiber cement;

ii) forming a continuous layer of film-forming polymeric binder over a surface of said substrate formed in i) by:
   a) applying to said surface a first coating composition comprising film-forming polymeric binder, and
   b) destabilizing said first coating composition prior to application of, upon contact of, or subsequent to application of said first coating composition on said surface;

iii) applying to the coated surface formed in ii) a second coating composition comprising a film forming polymeric binder; and iv) drying and curing said coated substrate formed in iii), for example in an oven or autoclave.

Surprisingly, finished mineral substrates coated by the method of the present invention exhibit a high gloss finish which is comparable with finished substrates formed by conventional processes. The method of the present invention enables high gloss finished substrates to be manufactured more quickly, and potentially in a more energy efficient manner, than similar finished substrates manufactured by conventional processes using aqueous coatings, where an aqueous coating is applied to the substrate after the substrate body has been dried and cured.

To assist further understanding of the present invention, but without wishing to be limited by it, the inventor offers the following as a simplistic explanation of the mechanism considered key to the success of the present invention: in the coatings formulation art it is known that the components of a stable coating composition can rapidly drop out of suspension or solution when that composition is suitably destabilize. Accordingly, when a coating composition is applied as a coating on an uncured mineral substrate and appropriately destabilized, the film-forming polymeric binder in the coating composition will drop out of dispersion or solution and the particles or precipitate of film-forming polymeric binder will begin to build over the surface of the substrate. Eventually, sufficient film-forming polymeric binder will build over the surface of the substrate so as to form a continuous layer thereover. Once formed, the continuous layer provides a substantially impervious barrier between the substrate and any subsequently applied coating compositions.

The first coating composition may be destabilized prior to, upon contact with or after it is applied as a coating on the uncured mineral substrate.

In a preferred embodiment, the composition of the first coating composition is such that it becomes destabilized upon contact with the uncured mineral substrate. For example, one or more components in the uncured mineral substrate may either react with one or more components in the coating composition to cause destabilization, or effect a pH change in the coating composition on contact with the uncured mineral substrate to cause destabilization. Coating compositions which are destabilized upon contact with an uncured mineral substrate are readily available to a person skilled in the art. For example, an aqueous dispersion which comprises a film-forming polymeric binder wherein the polymer contains strong cationic groups and weak acid groups and which is destabilized on contact with a basic substrate to rapidly form a coating by a coacervation process is disclosed in WO-98/52698. As another example, an aqueous dispersion which comprises a surfactant to maintain a dispersion of film-forming polymeric binder particles in suspension may undergo rapid colloidal destabilization upon contact with a basic substrate: such rapid colloidal destabilization may be as a result of, for example, the composition having a low calcium ion stability or a poor stability to high pH.

In another embodiment, the coating composition is destabilized prior to its application on the uncured mineral substrate, for example by co-mingling a destabilizer into the composition as it is being sprayed onto the substrate, which substrate need not itself be destabilizing on the composition.

In yet another embodiment, the coating composition is destabilized after it has been applied on the uncured substrate, for example by spraying a destabilizer onto the composition or by rapid dewatering of the composition after it has been applied to the substrate. The substrate need not itself be destabilizing on the composition. Destabilizing may effect a chemical reaction or pH change in the composition as described above, or it may effect a rapid increase in the polymer solids content of the composition above the critical value at which the polymer solids will coagulate.

A person skilled in the art will readily be able to identify or make a coating composition which can be appropriately destabilized. WO-98/52698 provides the person skilled in the art with a number of options for making such coatings, which coatings rely upon a coacervation process. The skilled person will also be aware of commercially available coating compositions which are capable of undergoing a colloidal destabilization process, or will be readily able to make such a composition.

Colloidal destabilization of a composition may result from the composition having, for example, a low calcium ion stability and/or poor stability to high pH.

Provided the layer of film-forming polymeric binder is continuous over the substrate before the second coating composition is applied and is sufficiently robust enough to withstand the application of the second coating composition, there is no minimum thickness of the layer: the layer may be from a molecule thick to several microns thick, preferably the layer is 5 to 20 microns thick. The second coating composition is preferably applied immediately or shortly after formation of the continuous layer and before the first coating composition has set or become dry-to-the-touch. Preferably, though it is not essential, the second coating composition is applied after the layer of film-forming polymeric binder has formed but before said layer has developed sufficient mechanical integrity for it to be considered "set" or "dry-to-the-touch" Alternatively, the second coating composition may be applied after the first coating composition has dried, though this is not preferred where dry time is greater than 3 minutes. Typically, the coating composition is sufficiently destabilized such that the continuous layer of film-forming binder is formed in less than 3 minutes, preferably in less than 2 minutes, more preferably in less than one minute, and most preferably in less than 15 seconds. Preferably, the second coating composition is applied within 3 minute of application of the first coating composition.

The process of the present invention advantageously enables a second coating composition to be applied to the substrate before the first coating composition has dried and/or the substrate has dried and cured.

Said first and second coatings may be exposed to hot air or infrared, ultraviolet or microwave radiation before said substrate body and coatings are subjected to the drying and curing in step iv), particularly if such exposure initiates or enhances destabilization of the first coating composition, but it is preferred for said first and second coating to dry and cure with the substrate and without any such special pre-cure treatments.

Preferably, drying and curing of the mineral substrate and coatings is effected at a temperature of at least 40° C.

The method of the present invention is preferably used to manufacture high gloss finishes on concrete substrates, most preferably on substrates such as concrete pipes, roof tiles, floor tiles, wall tiles and house sidings.

The uncured substrate body may be comprised of at least two superimposed layers of mortars of different compositions and characteristics. For example, such a process and apparatus for performing the process are described in U.S. Pat. Nos. 6,017,320 and 4,789,319, respectively. The apparatus disclosed in U.S. Pat. No. 4,986,744 may also be used for the manufacture of such multi-layered bodies. The layer of concrete which comprises the bottom surface of the body can be prepared by mixing a mortar composition to form a green concrete which is then extruded onto a continuous strand of moving bottom molds. Subsequently, if required, one or more other layers of green concrete or cementitious slurry, such as a colour coat, can be extruded or coated onto the first layer to form a multi-layered body of uncured mineral composition.

Preferably, both the first coating composition and the second coating composition are aqueous compositions. The aqueous composition used for the first coating may be the same or different from the aqueous composition used for the second coating. The film forming polymer used in the aqueous composition for the first coating may be the same as or different from the film forming polymer used in the aqueous composition for the second coating.

The first coating, which is preferably non-cementitious, may be an aqueous composition such as a paint or a clear coat. The second coating may be an aqueous composition such as a paint or a clear coat. The formulations of such coatings are well known in the art.

The film forming polymeric binder used in the coating composition preferably has a minimum film forming temperature (MFT) of at least –20° C., more preferably at least 0° C.

The film forming polymeric binder is preferably an organic polymer having a glass transition temperature (Tg) as measured by the Fox Equation of at least –40° C., more preferably at least –20° C., and most preferably at least 0° C. Preferably, the Tg of the polymeric binder is no more than 70° C., more preferably no more than 45° C.

The film-forming polymeric binder employed in the first and/or the second coating composition may be soluble or insoluble in said composition(s). However, the binder employed in the first coating composition must be insoluble when the composition is destabilized.

There are many commercially available organic polymer binders which are suitable for use in either of the coating compositions. Such binders are commonly sold for use in paints and clear coats or sold for use as cement modifiers. Provided such polymers have a Tg of above –40° C., it is believed they will be suitable.

The polymeric binder may from be a solution, latex emulsion or powder comprising a polymer polymerized from at least one or more of the following monomers: acrylic and methacrylic acid esters such as methyl(meth)acrylate, ethyl(meth)acrylate, butyl(meth)acrylate, 2-ethylhexyl (meth)acrylate, decyl(meth)acrylate, lauryl(meth)acrylate, isobornyl(meth)acrylate, isodecyl(meth)acrylate, oleyl (meth)acrylate, palmityl(meth)acrylate, steryl(meth) acrylate, hydroxyethyl(meth)acrylate and hydroxypropyl (meth)acrylate; acid functional monomers such as acrylic acid, methacrylic acid, crotonic acid, fumaric acid and maleic acid; mono-methyl itaconate; mono-methyl fumarate; monobutyl fumarate; maleic anhydride; acrylamide or substituted acrylamides; diacetone acrylamide; glycidyl methacrylate; acetoacetoxyethylmethacrylate; acrolein and methacrolein; dicyclopentadienyl methacrylate; dimethyl meta-isopropenyl benzyl isocyanate; isocyanato ethyl methacrylate; methyl cellulose; hydroxyethyl cellulose; styrene or substituted styrenes; butadiene; ethylene; vinyl acetate or other vinyl esters; vinyl monomers such as vinyl chloride, vinylidene chloride, N-vinyl pyrrolidone; amino monomers such as N,N'-dimethylamino(meth)acrylate and acrylonitrile or methacrylonitrile. Most preferably, the latex comprises an acrylic polymer, a styrene/acrylic polymer, a styrene/ butadiene polymer, a vinyl acetate/ethylene polymer, or polyvinyl acetate, or mixtures thereof.

It will be appreciated that the polymeric binder may be derived from a monomer mix which is polymerized after the monomers have been incorporated into the composition. Examples of such monomers include organic monomers such as epoxy monomers and isocyanate monomers.

Preferably the film forming polymer binder is from a polymer latex. The latex may be a dispersed polymer having its particles dispersed in an aqueous evaporable carrier, a water-reducible polymer, or a mixture thereof in the aqueous evaporable carrier. The aqueous evaporable carrier is preferably water but may be water having dissolved therein a water or polymer miscible organic solvent, such as methanol, ethanol or a glycol ether. In such embodiments, the polymeric binder is preferably present in the coating composition in an amount of from 0.5 to 70% by weight polymer solids based on the total weight of said composition. More preferably, if the coating is a paint or clear coat the polymeric binder is present in an a amount of from 20 to 70% by weight polymer solids based on the total weight of said composition.

Preferably, the mineral substrate is dried and cured shortly after the second coating is applied on top of the first coating, for example by passing the coated uncured substrate into an oven before the coatings have had opportunity to set or dry-to the-touch on the uncured substrate.

The invention will now be more specifically described in terms of the following examples of some preferred embodiments which are given for the purposes of illustration only, and may be contrasted with the comparative tests also given below.

EXAMPLES

A person skilled in the art will readily be able to identify or make coating compositions which are susceptible to appropriate destabilization. For example, compositions destabilized by a coacervation process are described in WO-98/52698. Compositions which are appropriately susceptible to colloidal destabilization may be known to the skilled person or may be readily determined by simple experimentation.

In these examples, the following are acrylic latex polymers available from Rohm and Haas:

Rhoplex MC 76 (47% solids) having a Tg of +15° C.
EC-2540 (55%) having a Tg of –15° C.
Rhoplex 928 (61%) having a Tg of –3° C.
Primal AC-264 (60%) having a Tg of +15° C.

The following tests are useful for predicting whether a given latex will be useful in or as a first coating composition (hereafter referred to as a "primer").

The primer is believed to function by undergoing rapid colloidal destabilization upon contacting the cementitious substrate. This causes coagulation of the latex polymer particles, which forms a barrier between the cementitious layer and a subsequent latex gloss coat. The cement instability of the primer latex can occur by various mechanisms, including (but not limited to) low calcium ion stability and poor stability to the high pH of cement. The tests below are designed to assist the skilled person to predict these kinds of instability and are provided only as guide.

1. Determination of "Calcium Ion Stability"

Enough of the latex to be tested is added to a 56.7 g (2 oz) glass jar such that the total amount of latex solids is 10.0 grams. Enough water is then added to bring the total to 25.0 grams, and thus 40.0% latex solids. A magnetic stirring bar is placed within the diluted latex, and the glass jar is placed on a magnetic stirrer that is placed beneath the outlet of a 50 cm$^3$ glass burette that is filled with a 1.4% aqueous solution of calcium acetate. The stirrer is turned on, and the speed adjusted such that a maximum vortex is achieved without over-speeding the stirrer.

When a good vortex is achieved, the calcium acetate solution is titrated into the latex at a rate of approximately 60 drops/minute. As the solution is added, the speed may have to be adjusted (typically upward) to maintain a good vortex. The calcium solution is added until an endpoint is reached (gellation or viscosity increase such that a vortex can no longer be maintained), or until 40 cm³ of solution has been added. The amount of calcium acetate added to reach the endpoint is recorded as an indication the calcium ion stability of the latex.

According to this titration method, latexes with a calcium ion stability of 30 cm³ or less are believed to be suitable primers for the present invention. In the present examples, primer polymer candidates had the following calcium ion stability:

| latex | solids | calcium ion stability |
|---|---|---|
| Rhoplex MC-76 | 47% | >40 cc |
| Rhoplex EC-2540 | 55% | 11 cc |
| Rhoplex-928 | 61% | >40 cc |
| Primal AC-264 | 60% | >40 cc |

Rhoplex and Primal are trade marks of Rohm and Haas Company, USA.

2. Demonstration of "Instability to High pH"

To 5 cc of Rhoplex-928 (61% solids), 0.5 cm³ of aqueous ammonium hydroxide were added with gentle swirling. Within 30 seconds, the latex was too viscous to pour or flow. Thus, although this latex is calcium ion stable, it is not stable to high pH and is believed to be a good candidate for a primer.

3. Demonstration of "Instability to High Polymer Solids"

In addition to the above mechanisms, a latex can undergo colloidal destabilization if its polymer solids content rises above a critical value. For a latex of uniform particle size, this critical solids is around 60%. For a latex with a broad particle size distribution, this value can be around 70% solids. Thus, if a primer latex of 55% solids content (i.e. 45% water content) is applied to a substrate, and the substrate absorbs ⅓ of the water from the primer and/or ⅓ of the water evaporates from the primer, the solids of this primer will rise to >70% and it will coagulate. Latexes which are applied at a higher initial solids content can undergo this mechanism of coagulation more rapidly.

It will be appreciated that the mechanism for rapid colloidal destabilization of the primer can be any combination of the above mechanisms. No measurement can be a perfect simulation of the phenomenon which occurs when a latex contacts a mineral substrate. The above simple laboratory tests are useful for predicting which latexes are likely to be suitable primers for the present invention, but are not limiting.

It will be further appreciated by those skilled in the art that common latex additives such as thickeners, wetting aids, coalescents and plasticizers may render the latex less stable towards cement. Whenever a latex is made less stable to cement by the inclusion of such additives, it is believed to become a more suitable primer for the present invention.

Summary of Experiments

Onto a fresh cementitious slurry, a cement unstable latex polymer primer (first coating composition) is applied. After sufficient time has passed to allow the primer to coagulate and skin over, a clear coat (second coating composition) is then applied. Note that the primer need not be thoroughly set or dry-to-the-touch before the clear coat is applied. The primer layer prevents calcium in the slurry from mixing with the clear coat, so that the latter can dry to high gloss. Furthermore, this primer+top coat system prevents efflorescence better than does a top coat alone.

Optical Measurements

The L* values were measured using a Colorgard System 2000 colorimeter (available from BYK-Gardner Inc) based on a scale of 0=black to 100=white.

Thus, darker colored tiles have lower values of L*, indicative of reduced efflorescence.

Specular gloss values were measured at 60° on a BYK Labotron in accordance with ASTM D 523-89. The higher the 60° Gloss value, the higher the gloss of the surface.

Example I—Preparation of Control Base Plates

A green concrete was made by mixing the following ingredients in a conventional manner:

| Ingredient | Parts by weight |
|---|---|
| #45 mesh (0.355 mm) builders sand | 300 |
| Type I Portland Cement | 100 |

Humidity) overnight. The L* and 60° gloss values were measured and the results are detailed in Table 1 as "Intial Measurements."

TABLE 1

| | Initial Measurement | | After Condensation Test | |
|---|---|---|---|---|
| Primer latex | L* | 60° gloss | L* | 60° gloss |
| 1. none | 29.7 | 4.5 | 29.3 | 2.4 |
| 2. MC-76 | 27.1 | 1.3 | 30 | 1.2 |
| 3. EC-2540 | 21.6 | 10.8 | 23.9 | 7.3 |
| 4. Rohplex 928 | 17.2 | 11.7 | 25.8 | 5.4 |
| 5. AC-264 | 21.6 | 8.0 | 21.8 | 9.5 |

When the primer is cement unstable (Entries 3–5), a darker and higher gloss finish is obtained. When no primer (#1) or a cement stable primer (#2) is used, initial efflorescence is worse (higher L* value) and the gloss is much lower.

Example V—Accelerated Condensation Test

In addition to their initially reduced efflorescence and higher gloss, it is desirable that rooftiles and related building elements maintian their superior appearance after exterior exposure. A well known method to predict this is with an accelerated condensation test. In this test, tiles were suspended in a closed cabinet, coated side facing down, 15 cm above a bath of 60° C. water for 4 days. After cooling and drying overnight, L* and gloss were again measured, and their values are included in Table 1.

The accelerated condensation test typically causes some additional efflorescence and/or loss of gloss for cementitious substrates In those examples which demonstrate the present invention, #3–5, the appearance advantage is maintained, when they are compared to control tiles #1 and #2.

Water

Round test base plates were made by hand packing 170 g of the green concrete into 90 mm petri dishes. The resulting patties were 13 mm thick, a similar thickness to conventional concrete rooftiles.

Example II—Preparation of Aqueous Cementitious Slurries

Aqueous cementitious slurries were formed by mixing the following components in a conventional manner.

|  | A |
|---|---|
| cement, type I | 100 g |
| #100 sand | 50 g |
| Bayferrox 318-M | 8 g |
| water | 50 g |
| calc. w/c | 0.50 |

Bayferrox 318-M is a black iron oxide pigment available from Bayer AG. The dry ingredients were mixed for one minute, then the water was added followed by 2 additional minutes of mixing.

Example III—Preparation of Uncured Test Tiles

Uncured test tiles were prepared by pouring slurry A onto a control base plate and spreading the slurry by tipping the sample and allowing the slurry to run to the edges. Gentle shaking gave a smooth surface. Enough slurry was used to give an average thickness of 0.5 mm over the uppermost surface of the control base plate.

Example IV—Clear Coating of Slurry-coated Tiles

Onto the fresh slurry surface, a primer latex was sprayed in one pass (ca. 8 microns). After a 10 second hold time, 4 passes of a commercially available aqueous clear coat composition consisting of a 100% butyl acrylate/methyl methacrylate copolymer dispersion (42% solids, Tg+25° C.) was applied. After coating, the uncured tiles were passed into an oven to be cured at 50° C. (75% Relative Humidity) for 4 hours and then dried at 25° C. (ambient Relative

I claim:

1. A method of coating a mineral substrate with at least one coating composition comprising a film forming polymeric binder, which method comprises the following process steps:
   i) forming said substrate from an uncured mineral composition;
   ii) forming a continuous layer of film-forming polymeric binder over a surface of said substrate formed in i) by:
      a) applying to said surface a first coating composition comprising film-forming polymeric binder, and
      b) destabilizing said first coating composition prior to application of, upon contact of, or subsequent to application of said first coating composition on said surface;
   iii) applying to the coated surface formed in ii) a second coating composition comprising a film forming polymeric binder; and
   iv) drying and curing said coated substrate formed in iii).

2. A method as claimed in claim 1, wherein said first coating composition is destabilized upon contact with said surface of said uncured mineral composition.

3. A method as claimed in claim 1, wherein the second coating composition is applied within three minutes of applying the first coating composition.

4. A method as claimed in claim 1, wherein the first coating composition is destabilized by a coacervation process.

5. A method as claimed in claim 1, wherein the first coating composition is destabilized by a colloidal destabilization process.

6. A method of improving the gloss finish of a mineral substrate formed by a process comprising the following process steps:
   i) forming said substrate from an uncured mineral composition;
   ii) forming a continuous layer of film-forming polymeric binder over a surface of said substrate formed in i) by:
      a) applying to said surface a first coating composition comprising film-forming polymeric binder, and
      b) destabilizing said first coating composition prior to application of, upon contact of, or subsequent to application of said first coating composition on said surface;
   iii) applying to the coated surface formed in ii) a second coating composition comprising a film forming polymeric binder; and
   iv) drying and curing said coated substrate formed in iii).

7. A method as claimed in claim 6, wherein said first coating composition is non-cementitious.

8. A method as claimed in claim 6 wherein the substrate is a roof tile.

9. A method as claimed in claim 6, wherein the first coating composition is destabilized by a coacervation process.

10. A method as claimed in claim 6, wherein the first coating composition is destabilized by a colloidal destabilization process.

* * * * *

UNITED STATES PATENT AND TRADEMARK OFFICE
CERTIFICATE OF CORRECTION

PATENT NO.    : 6,306,465 B1
DATED         : October 23, 2001
INVENTOR(S)   : Michael Damian Bowe It is certified that error appears in the above-identified patent and that said Letters Patent is hereby corrected as shown below:

<u>Column 8,</u>
Line 63, delete "water"
Line 24, insert into table:
-- water -- under "Ingredient" and insert
-- 41 -- under "Parts by Weight"

<u>Column 9,</u>
Line 36, move Column 8, lines 26-62 and insert it before "I claim:"

Signed and Sealed this

Twentieth Day of August, 2002

Attest:

Attesting Officer

JAMES E. ROGAN
*Director of the United States Patent and Trademark Office*